United States Patent [19]
Poincenot

[11] Patent Number: 4,599,023
[45] Date of Patent: Jul. 8, 1986

[54] DEVICE FOR MOUNTING A TOOL-HOLDER

[75] Inventor: René Poincenot, Larchant, France

[73] Assignee: Berthiez-Saint-Etienne, Saint-Etienne, France

[21] Appl. No.: 681,379

[22] Filed: Dec. 13, 1984

[30] Foreign Application Priority Data

Dec. 16, 1983 [FR] France ................................ 83 20225

[51] Int. Cl.⁴ ................................................. B23C 5/26
[52] U.S. Cl. .................................... 409/233; 408/239 R
[58] Field of Search .............. 409/231, 232, 233, 234, 409/215, 144, 230, 211; 408/239 R, 239 A

[56] References Cited

U.S. PATENT DOCUMENTS

| | | | |
|---|---|---|---|
| 3,851,364 | 12/1974 | Noa et al. | 409/231 |
| 3,868,886 | 3/1975 | Bondie | 409/233 |
| 4,325,664 | 4/1982 | Mori | 409/232 |
| 4,412,766 | 11/1983 | Eckstein | 409/144 |

FOREIGN PATENT DOCUMENTS

| | | |
|---|---|---|
| 1271500 | 6/1968 | Fed. Rep. of Germany . |
| 3235820 | 7/1983 | Fed. Rep. of Germany . |
| 3312571 | 10/1983 | Fed. Rep. of Germany . |
| 1552061 | 1/1969 | France . |

*Primary Examiner*—John McQuade
*Attorney, Agent, or Firm*—Walter H. Schneider

[57] ABSTRACT

A device for mounting a turning or milling tool-holder on the slide of a machine-tool, wherein a sleeve is mounted for sliding inside the slide body, said sleeve receiving internally a rotary spindle, and being designed to occupy one position in which it is moved inwards of the body and in which the turning tool-holder is immobilized on the seat of the slide, by means of notchings or serrations, under the action of an axial force exerted by one of the ends of the spindle on the turning tool-holder, and another position in which said sleeve is moved out of the slide body and brought against a centering seat of said body, for which the milling tool-holder is mounted on the end of the spindle which is rotatable under the action of rotating drive means.

8 Claims, 3 Drawing Figures

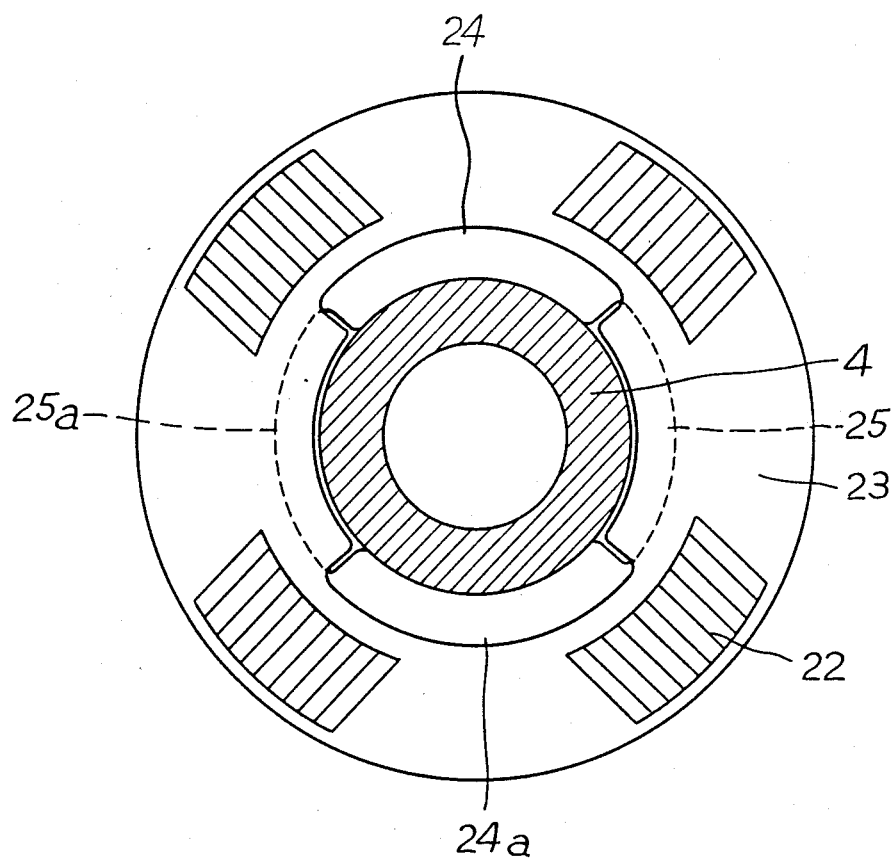

DEVICE FOR MOUNTING A TOOL-HOLDER

The present invention relates to a device for mounting a turning or milling tool-holder on the slide of a machine-tool.

When using a machine-tool, it may prove an advantage to be able to selectively mount on the same slide, a turning tool-holder, specially designed and adapted for that function, and a milling tool-holder.

This particular arrangement permitting to perform two different operations on the same machine-tool slide.

According to the present invention, a sleeve is mounted for sliding inside the slide body, said sleeve receiving internally a rotary spindle, and being designed to occupy one position in which it is moved inwards of the body and in which the boring tool-holder is immobilized on the seat of the slide, by means of notchings or serrations, under the action of an axial force exerted by one of the ends of the spindle on the turning tool-holder, and another position in which said sleeve is moved out of the slide body and brought against a centering seat of said body, for which the milling tool-holder is mounted on the end of the spindle which is rotatable under the action of rotating drive means.

With said device, it is possible to apply the pulling force on the tool-holder by direct action on the spindle, of which the outer end rests against the tool-holder, the seats and the sleeve being moved without any application of force being required. In the milling position, on the contrary, the control member acts on the sleeve to center said sleeve and the spindle inside the slide body.

The invention will be more readily understood on reading the following description with reference to the accompanying drawings, in which:

FIG. 3 is a cross-sectional view along line III—III of FIG. 1.

Figure 1:
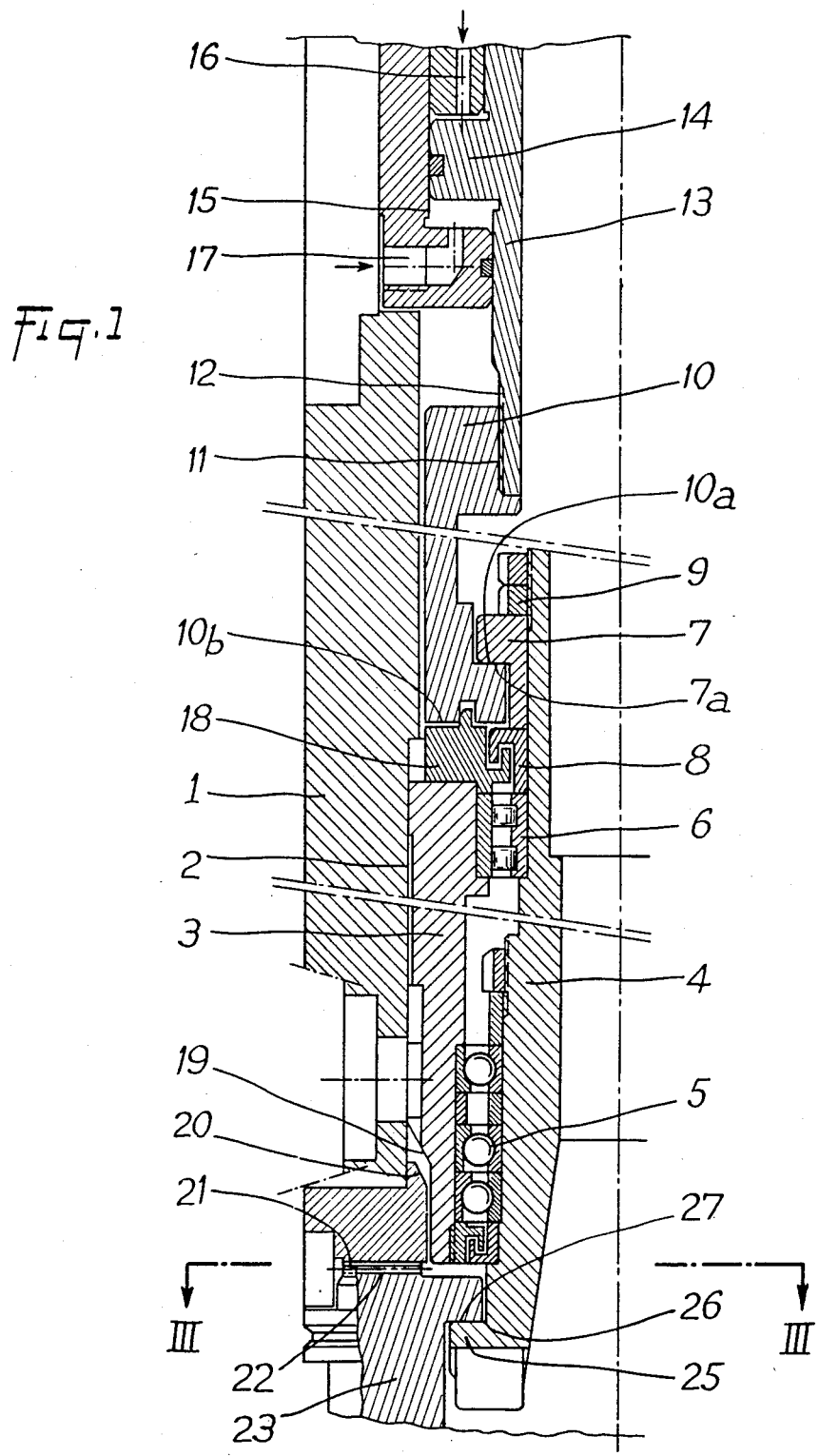
FIG. 1 is a half view of a longitudinal section of the slide of a machine tool, wherein the device according to the invention is in the position of clamping a turning tool-holder.

Referring first to FIG. 1, this shows a body 1 of a machine-tool slide, said slide being positioned vertically but being able to adopt any other position, said body being provided with an internal bore 2 in which a sleeve 3 is mounted for axial sliding, a spindle 4 being mounted for rotating in said sleeve by means of two sets of bearings 5 and 6.

At the upper part of the spindle 4 is fixed a ring 7 held firmly between a ring 8 integral with the spindle and nuts 9 screwed on a threaded part of said spindle, said ring 7 being provided with a shoulder against which the shoulder 10a of a tubular transmission member 10 can optionally rest, said member 10 being mounted for sliding inside the bore of body 1 of the slide.

Said transmission member 10 comprises a tapped hole 11 in which is screwed the threaded portion 12 of the rod 13 of a hydraulic jack of which the piston 14 moves axially inside a cylinder 15 provided in the slide body 1.

Said piston 14 being subjected on its two faces to the action of a hydraulic fluid which is admitted through pipes 16 and 17, thus moving the piston 14 alternately upwards or downwards. The hydraulic jack (14,15) could be replaced by any other pneumatic, electric or mechanical control means.

A ring 18 is secured on the upper part of sleeve 3, against which ring, a face 10b of the transmission member 10 connected to the piston 14 of the jack, can abut.

At the lower part of the sleeve 3, there is provided a conical seat 19 which, for the centering of said sleeve, is designed to rest against a complemental conical surface 20 provided in the slide body 1.

On the seat of the slide body 1 are provided serrations or notchings 21 into which are engaged corresponding serrations or notchings 22 provided on the upper face of the boring tool-holder 23.

To enable coupling and uncoupling of the tool-holder 23 and spindle 4, two notches 24, 24a (FIGS. 1 and 3) are provided in said tool-holder, at 180°, in which notches can engage two bars 25, 25a, which are likewise at 180°, and integral with the base of the spindle 4, which bars can, by rotating over an angle of 90°, rest by their face 26 against the face 27 of the part of the tool-holder 23 situated between notches 24 and 24a.

When tool-holder 23 is immobilized by its serrations 22 engaged in the corresponding serrations 21 of the seat of the slide body 1, the spindle 4 rests by its bars 25 against the face 27 of the tool-holder 23 under the effect of the axial pull exerted by piston 14 of the jack, subjected to the action of the fluid flowing into conduit 17, as illustrated in FIG. 1. Connection between spindle 4 and the jack rod 13 is achieved via transmission member 10 of which the shoulder 10a is in abutment against the shoulder 7a of the ring 7, integral with the spindle 4. Release of the tool-holder 23 is obtained by a translation of the sleeve 3 in order to allow the disengagement of serrations 22 of the tool-holder from serrations 21 of the seat of body 1, said sleeve being then rotated over an angle of 90° to allow the disengagement of bars 25, 25a of the spindles, from notches 24, 24a of the tool-holder.

Figure 2:
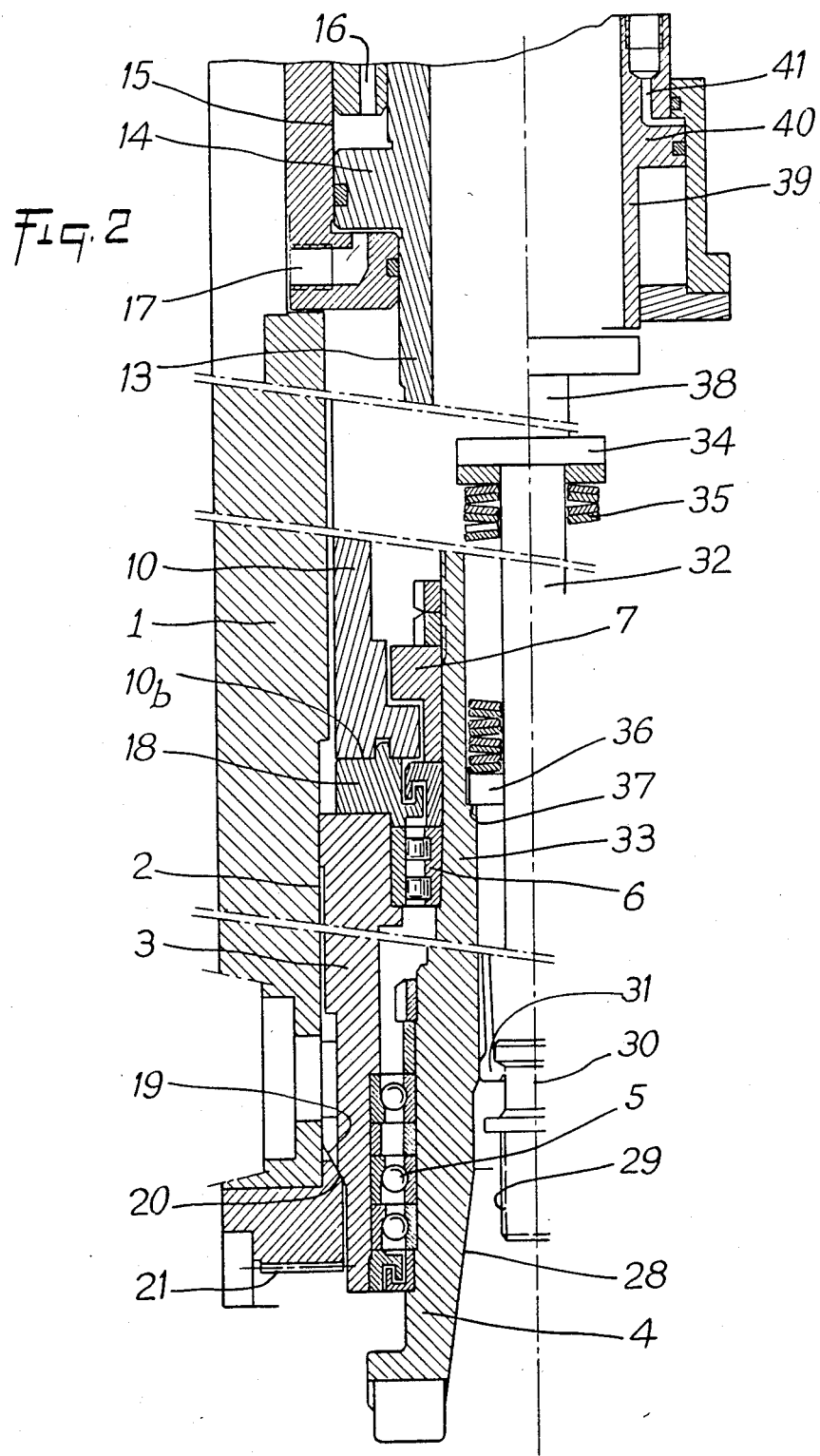
FIG. 2 is also a half-view of the cross-section of the device clamping a milling tool-holder.

FIG. 2 illustrates the same slide equipped with the device according to the invention, with the turning tool-holder 23 removed, the slide being ready to receive the milling tool-holder, (not shown).

In this particular case, the piston 14 is subjected to the action of the fluid flowing downwards from conduit 16, and exerts via face 10b of transmission member 10 a pressure on ring 18 and on sleeve 3, which latter is moved downwards so that its conical bearing part 19 abuts against the conical bearing part 20 of body 1.

The sleeve 3 of the spindle is then immobilized in translation and perfectly centered in the axis of the spindle.

Said spindle 4 is then able to rotate under the action of conventional rotating means, not shown.

In the conical recess 28 of spindle 4 is mounted a milling tool-holder, not shown, which is secured on the threaded part 29 of a pulling member 30, gripped within the jaws of a gripping member 31 integral with a rod 32 placed inside a bore 33 of the spindle 4.

The rod 32 is provided at its upper end with a head 34 against which rests one of the ends of a stack 35 of elastic washers, resting by its other end against the ring 36 which abuts against a shoulder 37 of the spindle 4.

On the head 34 of rod 32 can rest an intermediate ring 38 which is subjected to the action of rod 39 of a jack piston 40, subjected on one of its faces to the action of a hydraulic fluid admitted through conduit 41.

This device permits to grip the milling tool-holder via the pulling member 30 integral therewith, and which is gripped in gripping member 31 subjected to the pulling action exerted on rod 32, by the stack of elastic washers 35.

To release the tool-holder, piston 40 is actuated by admitting the hydraulic fluid through conduit 41, so that piston rod 39 pushes rod 32 downwards, via ring 38, by compressing said elastic washers 35. Gripping member 31 being thus pushed back downwards, enables to release pulling member 30 and the milling tool-holder, not shown.

The invention is in no way limited to the description given hereinabove and on the contrary covers any modifications that can be brought thereto without departing from its scope.

What I claim is:

1. A device for mounting and releasing a turning or milling tool holder by its upper face to the seat of the slide body of a machine tool which comprises: a sleeve within an axial bore of said slide body mounted for axial displacement therein; a rotatable spindle mounted within said sleeve for axial displacement therewith; a transmission member also mounted for axial displacement within said bore one end of which is connected to a source of displacement power, the other end of which is adapted to transmit its axial displacement in one direction through one end of said sleeve and in the other direction through one end of said spindle; and means at the other end of said spindle adjacent the seat of said slide body adapted to cooperate with means on said tool holder for coupling the latter by its upper face to the seat of said slide body, the upper face of said tool holder being brought into a coupling relationship with the seat of said slide body by the axial displacement of said spindle by said transmission member and released therefrom by the axial displacement of said sleeve by said transmission member.

2. A device according to claim 1 in which said one end of said spindle is provided with a ring having a shoulder adapted to cooperate with a corresponding shoulder on said other end of said transmission member.

3. A device according to claim 1 in which said one end of said sleeve is provided with a ring adapted to abut said other end of said transmission member.

4. A device according to claim 1 in which said tool holder, when brought into a coupling relationship with said slide body, is rotationally immobilized with respect thereto by cooperating serrations on the upper face of said tool holder and on the seat of said slide body.

5. A device according to claim 1 in which the other end of said sleeve is conically-shaped so as to cooperate with a complementary conically-shaped wall of said axial bore at the seat of said slide body.

6. A device according to claim 1 in which said means at the other end of said spindle comprises two bars positioned at 180° apart which cooperate with corresponding notches in said tool holder, the faces of said bars being caused to rest against the lower face of said tool holder when said bars are placed in said notches and rotated through 90°.

7. A device according to claim 1 in which said one end of said transmission member is connected through a rod to the piston of a hydraulic jack.

8. A device for mounting and releasing a turning or milling tool holder by its upper face to the seat of the slide body of a machine tool which comprises: a sleeve within an axial bore of said slide body mounted for axial displacement therein; a rotatable spindle mounted within said sleeve for axial displacement therewith; a transmission member also mounted for axial displacement within said bore one end of which is connected through a rod to the piston of a hydraulic jack, the other end of which is adapted to transmit its axial displacement in one direction by abutment with a ring on one end of said sleeve and in the other direction by means of a shoulder cooperating with a corresponding shoulder on one end of said spindle; means at the other end of said spindle adjacent the seat of the slide body comprising two bars positioned at 180° apart which cooperate with corresponding notches in the lower face of said tool holder, said bars being caused to rest against the lower face of said tool holder when said bars are placed in said notches and rotated through 90°; and the other end of said sleeve being conically-shaped so as to cooperate with a complementary conically-shaped wall of said axial bore at the seat of said slide body, the upper face of said tool holder being brought into a coupling relationship with the seat of said slide body by the axial displacement of said spindle by said transmission member and released therefrom by the axial displacement of said sleeve by said transmission member, said tool holder when brought into a coupling relationship with said slide body being rotationally immobilized by cooperating serrations on the upper face of said tool holder and on the seat of said slide body.

* * * * *